United States Patent Office 3,445,577
Patented May 20, 1969

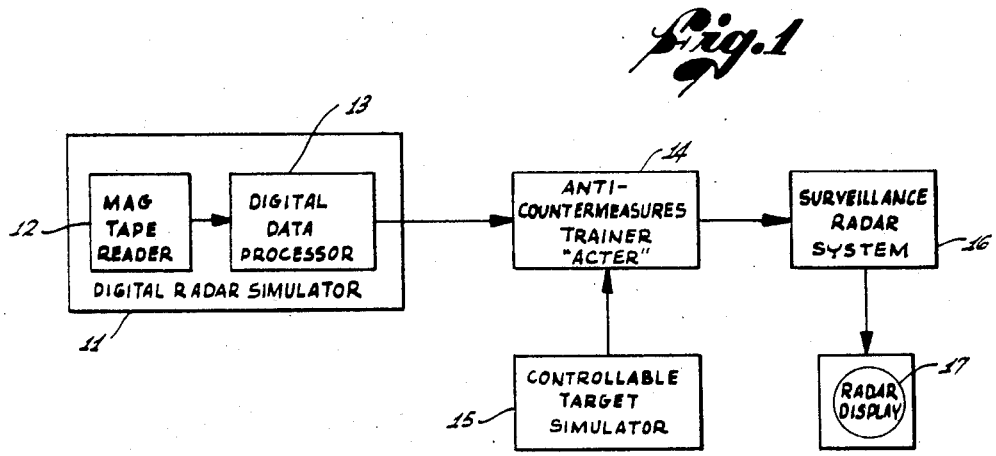
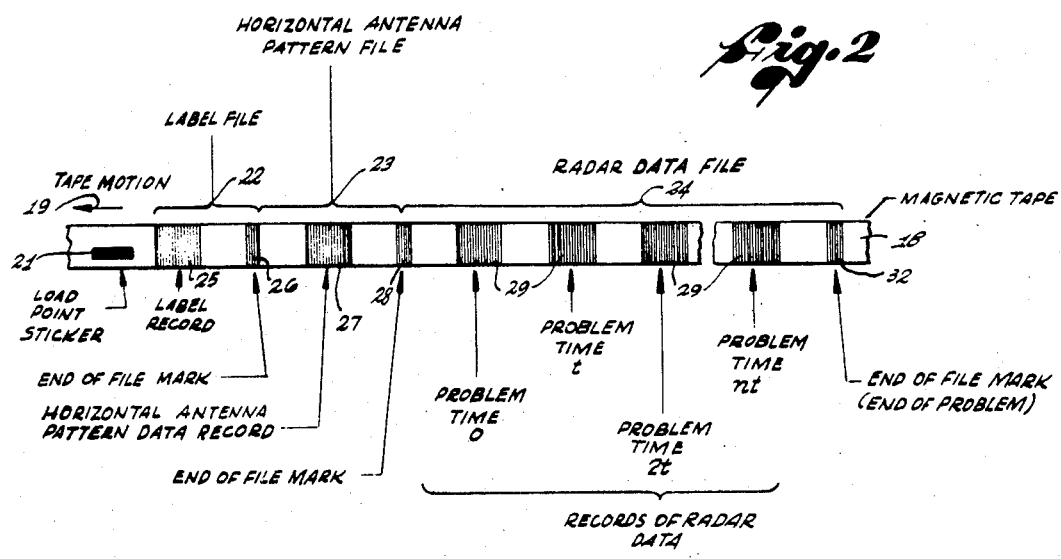

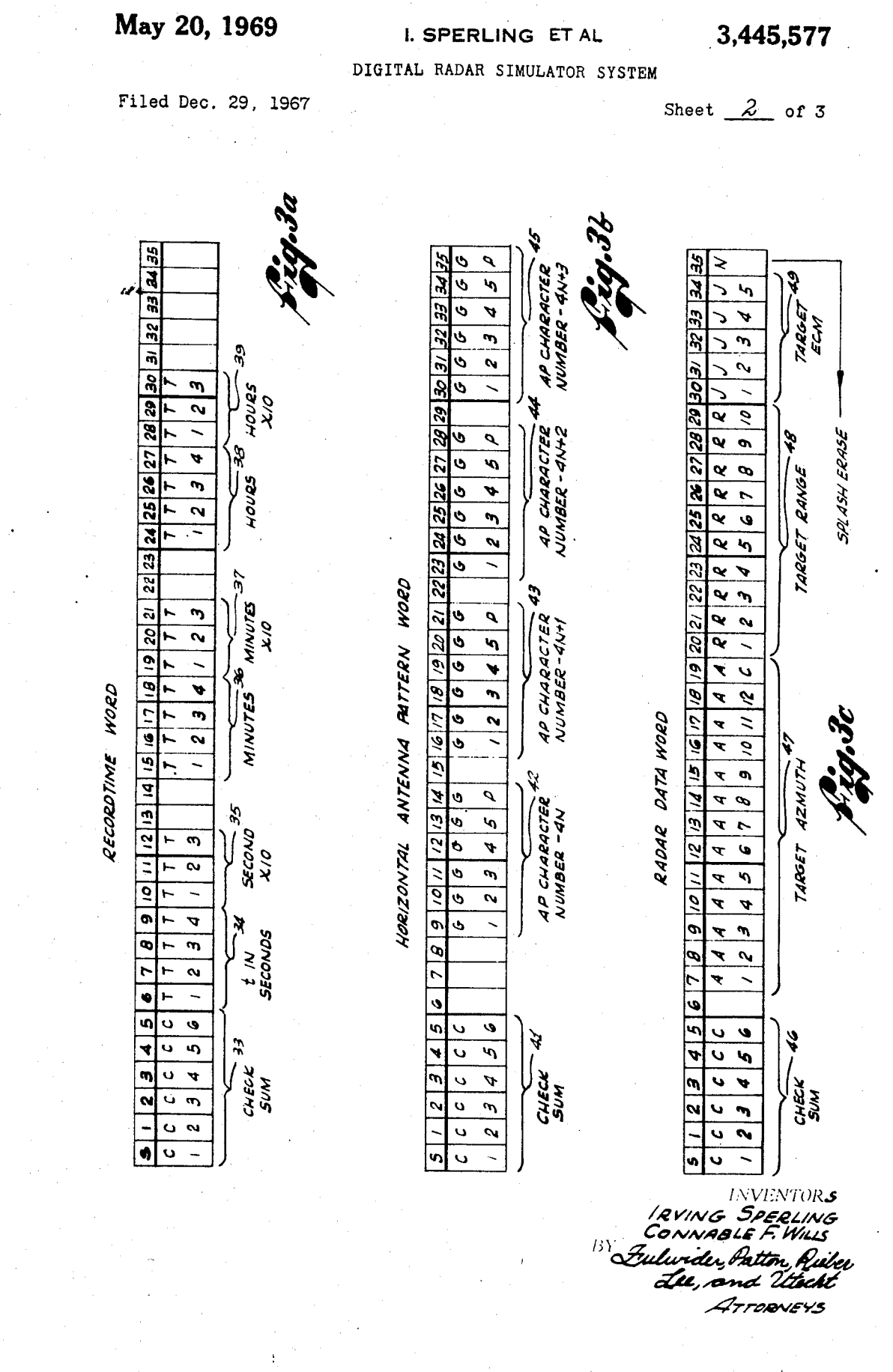

3,445,577
DIGITAL RADAR SIMULATOR SYSTEM
Irving Sperling, Van Nuys, and Connable F. Wills, Venice, Calif., assignors to System Development Corporation, Santa Monica, Calif., a corporation of California
Filed Dec. 29, 1967, Ser. No. 694,441
Int. Cl. G09b 9/00; G01s 9/00
U.S. Cl. 35—10.4                                      13 Claims

ABSTRACT OF THE DISCLOSURE

A digital radar simulator supplying search radar systems with precise and rapid simulated target and electronic countermeasure input data for training programs. The simulator provides for splashing or recall of any target at any time during an exercise and when a target is splashed both its video and electronic countermeasure data are removed from the simulation product. A magnetic tape reader feeds antenna pattern data to an antenna pattern storage delay line at the beginning of each exercise where it is stored for the remainder of the exercise. It then feeds target and electronic countermeasure input into a target storage delay line which keeps the data constantly recirculating. Target returns are simulated by constantly comparing the radar antenna's azimuth position with the azimuth position of each stored target. When an azimuth match occurs and no splash bit has been entered the range information is transferred to a target generator unit which converts the digital range data into an equivalent time delay. The start of this time delay is synchronized with the radar range trigger. At the end of the equivalent time delay period a video pulse representing the target echo is generated and fed to a standard anti-countermeasure trainer (ACTER) such as the Air Force OA–1767 and thence to the search radar system where it may be displayed. For electronic countermeasure processing, the air space surrounding the search radar is divided into 256 sectors of 1.4° each and, just prior to the time that the antenna scans a given sector, computer elements utilizing the stored antenna pattern and jamming intensity data calculate an electronic countermeasure control signal which represents a composite picture of the instantaneous sum of all the jamming power from all aircraft within radar coverage which would be entering the main, side and back lobes of the radar antenna at that sector. The electronic countermeasure data is normally in db and a simple subtraction of the antenna pattern data therefrom results in a division of power by gain. For summation of the power the electronic countermeasure data is converted from db to watts power and the electronic countermeasure powers of all targets in a 1.4° segment are linearly added and then converted back into db for subtraction of the antenna pattern data therefrom. The result is again converted from db into watts for summation of all the 256 sectors and back again into db to be fed to the ACTER in synchronism with the search radar antenna rotation as the instantaneous sum of all the jamming power entering all the lobes of the antenna from all aircraft when the antenna is physically positioned in the sector being calculated for display.

Background of the invention (1) This invention is in the field of radar simulators providing search radar systems with simulated target and electronic countermeasure data for training programs for radar operation personnel.

(2) Earlier radar simulators have in general been of the analog type and have been relatively inaccurate, slow and very expensive, and do not lend themselves to providing search radar systems with precise and rapid input data. Thus, they have been inadequate for training purposes, particularly for netted training exercises in computer based radar systems where changes in target range azimuth and jamming intensity must be correlated between the different radar sites.

The overall functions of the present invention may be individually old in various existing simulators but their information storage techniques have been complex and expensive, and their simulation of actual jamming conditions for the various targets with respect to the actual radar location have been inaccurate and complex. The techniques for suppressing any individual target and its associated jamming are likewise unsatisfactory in previously known simulators.

Summary of the invention

The present invention provides a digital radar simulator which is inherently accurate and fast and provides modern search radar systems with more precise and rapid simulated target and electronic countermeasure input data. It provides high fidelity simulation extremely valuable in air defense training and evaluation systems where it will significantly improve operator performance. The simulator of this invention makes the complex task of generating simulated radar data for system training and evaluation easier, more accurate, and less expensive than in previous radar simulator devices. The simulator of this invention utilizes delay line techniques for information storage which are much simpler and cheaper than the memory core matrix storage units and the like previously used in radar simulators.

The present invention further provides improved and accurate means for computing simulated jamming to more closely approximate actual jamming conditions in its computation of the electronic countermeasure data for each antenna sector by summing the jamming power for each such sector and modifying it by the antenna pattern data corresponding to the current bearing of the radar antenna and then summing all of the modified sector jamming signals to secure a simulated jamming signal for that current antenna bearing which will closely approximate actual jamming conditions from the target range, azimuth and electronic countermeasure input data in the exercise for all targets which have not been splashed.

The present invention further provides improved means and techniques for splashing or recalling any target and its associated jamming from the problem so that the target will no longer be displayed and its jamming omitted from the summation, thus simulating destruction of a previously identified target.

In general, it is the object of the present invention to provide improved, lower cost, more sophisticated radar simulation equipment feeding modern search radar systems with more precise and rapid simulated target and electronic countermeasure input data for air defense training systems.

Other objects and features of the present invention will be apparent from the following description and the appended drawings.

Brief description of the drawings

FIGURE 1 is a schematic representation of a search radar training system incorporating the digital radar simulator according to the present invention;

FIGURE 2 is a representation of the radar simulator input magnetic tape layout of the present invention;

FIGURE 3a illustrates the word format for record time which is the first time of every record;

FIGURE 3b illustrates the word format for the horizontal antenna pattern representing the main, back and side lobe attenuation of the radar antenna resolved into azimuth sectors;

FIGURE 3c illustrates the word format for the radar data containing the azimuth, range and associated electronic countermeasure intensity level for one target.

Description of the preferred embodiment

Figure 4:
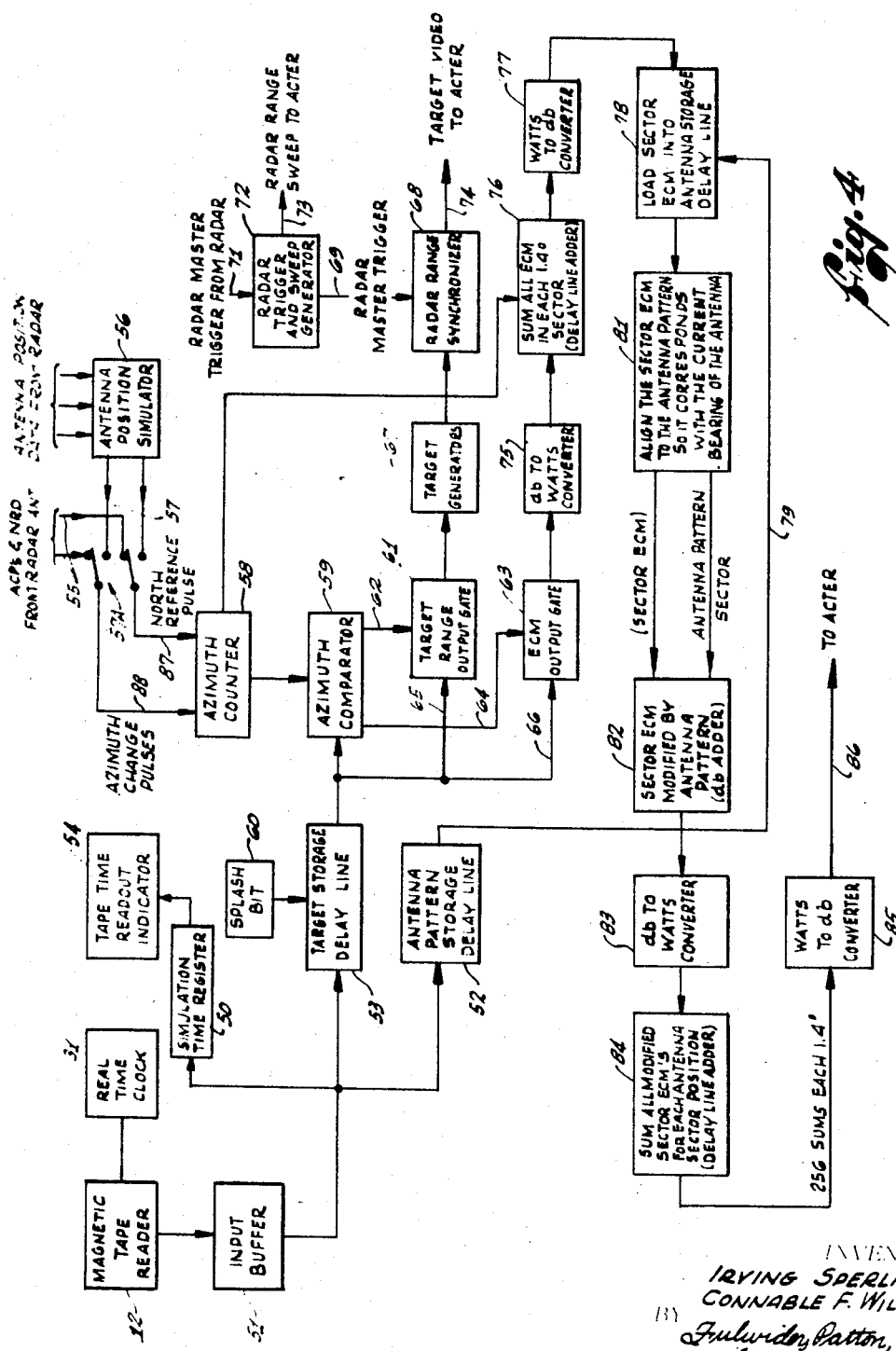
FIGURE 4 is a schematic diagram of the computer elements constituting the digital radar simulator of the present invention.

A typical installation of a search radar training system utilizing the digital radar simulator of the present invention is shown in block diagram in FIGURE 1. The digital radar simulator block is indicated at 11 as including a magnetic tape reader 12 and a special purpose digital computer or data processor at 13. The output of the digital radar simulator is fed to a known anti-countermeasure trainer (ACTER) 14 which may be the U.S. Air Force ACTER identified as OA-1767. A controllable radar target simulator at 15 likewise may be a standard U.S. Air Force device identified as AN/GPS-T4. The output of the ACTER leads into the search or surveillance radar system 16 which in turn supplies data to the radar display tube 17. The simulation system can provide all of the pre-programmed target and electronic countermeasure input data necessary to stress any of today's operational surveillance radar systems.

The digital radar simulator of this invention operates from problem data storage means from which problem data is read and fed into the digital data processor portion of the simulator. Specifically, the pre-programmed problem data is illustrated in FIGURE 2 as stored on magnetic tape 18 which is fed through the reader 12 in the direction of the arrow 19. A load point sticker 21 facilitates the proper loading of the tape in the reader. The magnetic tape is pre-programmed in a digital format having a series of files including a label file 22, a horizontal antenna pattern file 23 and a radar data file 24. The label file 22 contains the necessary data to identify the problem and the radar site for which it was designed, which information is contained in the label record 25, the end of the file being established by the end of file mark 26.

The horizontal antenna pattern file 23 contains the data which describes the exact horizontal antenna pattern of the specific radar at the site where the exercise is to be used. This horizontal antenna pattern data is laid out first with a record time word of all zeros for zero time, followed by sixty-four (64) antenna pattern data words. The record time word and the sixty-four antenna pattern data words are contained in the record block 27 and the end of the horizontal antenna pattern file is indicated by the end of file mark 28. The horizontal antenna pattern data is inserted into the digital data processor only at the beginning of each problem and is stored therein for use throughout the entire problem.

The radar data file 24 is made up of a plurality of radar data records 29, each of which begins with a record time word giving the problem times at which the radar data is to be inserted for times 0, $t$, $2t$, etc. to time $nt$ at the end of the problem. The record time word in the radar data record is followed by the radar data words, in sequence, for all targets which are scheduled to appear within the radar's coverage during one 360° scan of the antenna at the problem time given by the record time word. At the end of transmittal of each radar data record 29 movement of the magnetic tape 18 through reader 12 is automatically stopped, and it is started again when the next updating pulse is received from a real time clock 31, shown in FIGURE 4. An end of file mark 32 on the magnetic tape terminates the preprogrammed problem thereon.

The formats of the three different types of words used in the digital radar simulator of this invention are shown in: FIGURE 3a for the record time word; FIGURE 3b for the horizontal antenna pattern word; and FIGURE 3c for the radar data word. Both the horizontal antenna pattern data record 27 and the radar data records 29 begin with record time words as shown in 3a which in the case of the horizontal antenna data record and the first radar data record are in the form of all zeros indicating time zero. Subsequent data records will be inserted at the problem times identified by their record time words from time zero through time $t$, $2t$, etc. to the last problem time $nt$.

Each data word programmed on the tape 18 consists of thirty-six (36) bits divided into six 6-bit characters; S and 1–5 at the beginning of the word giving the check sum that gives the exact number of "1's" in the next thirty bits. This check sum is used to insure that only correct information is entered into the simulator. When the data in a word does not coincide with its check sum that word is bypassed and an error is indicated on the simulator control panel. Additional control checks may be made using parity information included within each data word.

The record time word of FIGURE 3a is the first word of every record and is coded in the format shown in FIGURE 3a with the problem time in hours, minutes and seconds at which the record is to be read into the simulator. In the format the bit numbers are given at the top as S and 1–35; thereunder is the letter designating the purpose of the bit, with C for check sum and T for time. The check sum bits appear at 33 beneath the letter C; the time in seconds is given by the four bits at 34; the time in seconds times 10 is given by the three bits 35; the time in minutes is given by the four bits 36; and the time in minutes times 10 is given by the three bits 37; the problem time in hours is given by the four bits 38 and the problem time in hours times 10 is given by the three bits 39. Summation of the above will give the total elapsed problem time and will identify the radar data record to be fed into the simulator at that time.

The horizontal antenna pattern word, after its check sum, gives a simulated representation of the main, back and side lobe attenuation of the search radar and antenna being used in the problem. The antenna pattern is resolved into approximately 1.4° azimuth sectors corresponding to the sector sampling previously described. The antenna pattern record is fed into the simulator only at the beginning of the problem and kept stored therein for electronic countermeasure computation as will be explained more in detail in the description of the block diagram of FIGURE 4 and the operation thereof. The numbers at the top in FIGURE 3b again indicate the number of the bits, S and 1–35; the letter C again indicates the check sum while the letter G is an arbitrary symbol for the attenuation. The check sum is given by the six bits 41; the antenna character numbers by the sets of six bits 42–45.

Each radar data word in the records 29 is in the format of FIGURE 3c with the check sum at the beginning, followed by information of the azimuth, range and associated electronic countermeasure intensity level for one target. Radar data words for each target are included in each radar data record. The accuracy of the simulator may be given by the example that the azimuth may be resolved to 0.089°; target range to approximately one-fourth of a nautical mile; and the electronic countermeasure intensity in 3 db increments with an approximate dynamic range of 90 db. The check sum is given by the six bits 46; the target azimuth by the thirteen bits 47; the target range by the ten bits 48; and the target electronic countermeasure intensity level by the five bits; the information supplied by the bits 47–49 is indicated by the letters thereabove—A for azimuth; R for range; and J for target electronic countermeasures intensity.

The digital radar simulator of this invention is schematically shown in the block diagram of FIGURE 4. The magnetic tape reader is again numbered 12 and is under the starting control of a real time clock 31 which sends timed pulses into the magnetic tape reader to initiate its operation at times $t$, $2t$, etc. at which the radar data records 29 are to be inserted into the simulator. As previously described, the magnetic tape reader is automatically stopped at the end of each radar data record.

The pre-programmed record information on the magnetic tape 18 is assembled in an input buffer 51 which transfers it to the appropriate storage delay line or readout represented as: an antenna pattern storage delay line 52, a target storage delay line 53, and a simulation time register 50. The simulation time register supplies a readout at a tape time readout device 54. Radar antenna azimuth information can be secured from the actual radar position indicator on the lines 55 or from an antenna position simulator 56 on the line 57, under the control of a two-pole selection switch 57A. This antenna position information is pulsed into an azimuth counter 58 from which it is fed into a comparator 59 which compares target azimuth with radar antenna azimuth.

To remove a target from the problem to simulate destruction or temporary loss thereof there is provided a splash bit inserter 60 which may be manually operated to add a bit to a target azimuth data thereby preventing a match of the radar position azimuth and that target azimuth data.

When the azimuth of the radar antenna from the azimuth counter 58 matches the azimuth of a target from the delay line 53 in the azimuth comparator 59, the comparator signals for operation of a target range output gate 61 over line 62, and for operation of an electronic countermeasure output gate 63 over line 64. The target range and electronic countermeasure intensity data are fed to their respective gates on lines 65 and 66, respectively.

The target range data passes through the gate 61 to target generators 67 which feed to a range synchronizer 69 which also receives a real or simulated radar master trigger signal over logic line 69. The real radar master trigger signal may come from the radar, as indicated by the line 71 which can feed directly to line 69 or a radar trigger and sweep generator 72 may simulate the data and transmit it over line 69 to the radar range synchronizer. The radar master trigger data is also fed to the ACTER as indicated by logic line 73. Video signals are fed from the synchronizer 68 on logic line 74 to the ACTER.

Electronic countermeasure intensity level data feeding through the gate 63 is changed by a converter 75 from db to watts power and an adder 76 sums all the electronic countermeasure power in each 1.4° azimuth sector identified from the azimuth counter 58. After summation, the resultant is changed back from watts power to db by a converter 77 and loaded into the antenna pattern storage delay line as indicated by the block 78 connected by a logic line 79 to the antenna pattern storage delay line. The sector electronic countermeasure data is aligned at 81 with the antenna pattern data to correspond with the current bearing of the radar antenna and the sector electronic countermeasure summation in db and the antenna pattern for that sector are algebraically added in an adder 82 to give a signal of the attenuation of the electronic countermeasure intensity by the antenna pattern. The resultant db is again changed to watts power in a converter 83 which loads the information for each sector into a delay line adder 84 which sums the attenuated electronic countermeasure intensities for all the sectors. The summation is changed in a converter 85 back from watts power to db and is fed to the ACTER along logic line 86.

The operation of the digital radar simulator of this invention as illustrated in FIGURE 4 will now be described. Just prior to the start of an exercise the horizontal antenna pattern data is entered by the magnetic tape reader 12 from the pre-programmed magnetic tape and assembled in the input buffer 51. Once assembled, this data is transferred to the antenna pattern storage delay line 52 where it remains throughout the entire exercise to be used for electronic countermeasure computations. This data does not change for a given problem using a particular antenna at a particular radar site. After the horizontal antenna pattern has been loaded into its delay lines to operator can start the training program and the remainder of the data, with the exception of the record time word information, is entered into the target storage delay line according to the preset update rate which is under the automatic control of the real time clock 31. This data is entered sequentially by succeeding radar data records through the input buffer, the magnetic tape stopping automatically at the end of each radar data record to wait the next update pulse from the real time clock 31 before entering the data from the next record.

The first word of each radar record is a record time word and the time data is transferred from the input buffer to the simulation time register 50 where it is processed and displayed on the tape time readout indicator 54. The remaining information in each radar data record, containing the target and electronic counter-measure data, is entered through the input buffer 51 to the target storage delay 53 where the range, azimuth and electronic countermeasure intensity data for all targets appearing within radar coverage are continuously recirculated.

As the azimuth portion of each radar data word reaches the end of the delay line 53 it is compared in the azimuth comparator 59 with the radar antenna position contained in the azimuth counter 58. The azimuth counter is reset to all zeros with each north reference pulse it receives from the radar antenna or position simulator on line 87 and thereafter it increments in 0.089° steps with the receipt of each azimuth change pulse over line 88 from the radar antenna or its simulator. In this manner the azimuth counter indicates the azimuth position of the radar antenna within a 0.089° accuracy at any given instant. Within each azimuth change pulse time period of approximately 2.93 milliseconds for a 5 r.p.m. antenna, the azimuth positions of all targets are compared with the antenna position.

When a match occurs between the antenna azimuth and a target azimuth the range data associated with the matching target azimuth is extracted through the target range output gate 61 and entered into a target generator 67, and the range data from the generator is synchronized at 68 with the radar master trigger, actual or simulated. This synchronization in effect stores the target range data until the radar range sweeps reaches a position corresponding, in time, to the range to the target. At that time a video target pulse (synchronized in range and azimuth with the search radar) is emitted and applied, for example, over logic line 73 to the ACTER 14 of the total system of FIGURE 1. The ACTER modulates the video target pulse to the radar intermediate frequency and inserts it into the radar receiving system.

Once a target pulse is generated by a target generator 67, that particular target generator will automatically generate a pulse on each succeeding radar trigger until an appropriate number of "hits" (determined by a preselected azimuth run length) have been processed. After the azimuth run length is completed that target generator is free to process another target. Since each target generator is used for a considerable number of radar range sweeps additional target generators are required if more than one target is to appear along the same sweep. The number of target generators determines the maximum number of targets which can be programmed along the same range sweep.

Electronic countermeasure data is extracted from the radar data word by the same technique used to obtain the target range information. That is, when a match occurs between the target azimuth and the antenna azimuth in the comparator 59, the electronic countermeasure intensity data is passed through the output gate 63, changed from db into watts power in the converter 75, and fed to a power summar in the form of delay line adder 76. The adder 76 accumulates all of the electronic countermeasure power that will enter the radar main lobe within each 1.4° sector of antenna azimuth. As each sector summation is achieved the resulting power is changed back from watts to db in the converter 77 and transferred into a storage delay line, which may be the antenna pattern storage delay line, where the current electronic countermeasure power summation may be continuously stored with the antenna pattern data. The sector summation of the electronic countermeasure db and the antenna pattern for the current bearing of the antenna are aligned at 81 and combined at 82 to give a composite electronic countermeasure intensity level which is the instantaneous sum of all electronic countermeasures entering the main, side and back lobes of the surveillance radar antenna. The modified sector electronic countermeasure signal is then changed from db to watts in the converter 83 and the signals for all of the sectors are added in the delay line adder 84 and the composite of all the 1.4° sectors is again changed back from watts to db in the converter 85 and used from logic line 86 to control a broadband noise generator, such as that contained in the ACTER, to be fed into the radar for display on the tube 17.

When a target is to be suppressed, a single bit is added to the azimuth portion of the radar data word for that particular target by means of the splash control 60 on the simulator control panel. In effect, this extra azimuth bit prevents an azimuth match between the target and the antenna position in the comparator 59 and as a result neither the target range nor the electronic countermeasure intensity data associated with that target will be processed through the output gates 61 and 63. The extra azimuth bit of a splashed target remains with the radar data word of that target in the recirculating target storage delay line until that target is either manually unsplashed from the control panel or until a new target to track is programmed in its place from the magnetic tape. Each such new target track is programmed onto magnetic tape with an unsplash bit which will automatically remove any previous splash data. In this way the instructor can simulate the destruction of a target, the temporary loss of a target, or the arrival of a new target in place of a splashed target track. This enables the operator to modify the target and electronic countermeasure data while the problem is running to provide for almost unlimited variance of the pre-programmed problem originally stored on the magnetic tape.

We claim:
1. A radar simulator system comprising:
    means for storing pre-programmed exercise data including the pattern of the radar antenna and the range, azimuth and electronic countermeasure intensity of a plurality of simulated targets;
    a reader for said storing means;
    input means fed from said reader;
    an antenna pattern delay line arranged for loading with the antenna pattern data by said input means at the beginning of the exercise and recirculating the antenna pattern data throughout the exercise for use in computing the electronic countermeasure intensity to be displayed on the radar display tube;
    storage means for the target data fed from said input means;
    a comparator for comparing the azimuth of the radar antenna with the azimuth of the targets to attempt a match;
    means for generating a target video signal;
    means for determining a composite electronic countermeasure intensity signal;
    and means for feeding the data of a target whose azimuth matches the antenna azimuth to said last two mentioned means.
2. The radar simulator system recited in claim 1 in which:
    said target data storage means comprises a delay line through which the target data is recirculated until updated by new data fed through said input means by the reader.
3. The radar simulator system recited in claim 1 and comprising:
    means for operating said reader in step by step relation including means for stopping the reader at the end of each record of target data;
    and timed means for restarting the reader after a predetermined update timing period.
4. The radar simulator system defined in claim 3 in which:
    each target data record begins with a problem time word;
    a problem time indicator;
    and means for setting said indicator from said problem time words fed thereto by said input means.
5. The radar simulator system defined in claim 1 in which said means for determining a composite electronic countermeasure signal comprises:
    means for summing the electronic countermeasures of all targets within radar sectors of predetermined width;
    means for modifying the sector sums by the antenna pattern data;
    and means adding the modified sector sums for each antenna sector position to secure a composite signal used to effect an electronic countermeasure display on the radar screen.
6. The radar simulator system defined in claim 1 in which said means for determining a composite electronic countermeasure intensity signal comprises:
    means for converting the db of the signal into watts power;
    means for summing the powers of all signals within horizontal radar sectors of predetermined width;
    means reconverting the sector summations back to db;
    means modifying each sector summation in db by the antenna pattern of the sector position;
    means converting the modified sector summations to watts power;
    means adding all the powers of the modified sector summations to secure a composite of all the electronic countermeasures of the targets;
    and means for reconverting the composite to db for use in preparing a countermeasure intensity display for the radar screen.
7. The radar simulator system defined in claim 1 and including:
    means for splashing a target from the exercise by modifying the azimuth data for that target to prevent any match between the target azimuth and the antenna azimuth, thereby preventing processing of information data for that target.
8. The radar simulator system recited in claim 7 in which:
    said splashing means includes means for manually adding a bit to the digital azimuth value of a target to be splashed to assign it a fictitious value beyond actual azimuth values.
9. A radar simulator system comprising:
    a magnetic tape reader for magnetic tape containing pre-programmed simulated target data for an exercise;
    means for storing the antenna pattern data of the radar for use throughout the exercise in computing an electronic countermeasure signal for the radar;
    a target data storage delay line for recirculating target data until updated from said reader;
    a comparator for comparing the azimuth of the radar antenna with the azimuth data for the targets to attempt a match;
    means for generating target video signals;
    means for determining a composite electronic countermeasure intensity signal;
    and means responsive to an azimuth match in the com- parator for feeding the data of the matching target to said last two mentioned means.

10. The radar simulator system defined in claim 9 in which:
said antenna pattern data storage means is a delay line through which the antenna pattern data is recirculated without change throughout the exercise.

11. The radar simulator system defined in claim 9 in which said means for generating target video signals includes:
a plurality of target signal generators equal in number at least to the number of targets it is desired to display along the same radar range sweep;
and means for synchronizing the target signals in azimuth with the azimuth of the radar antenna sweep to display the targets in their proper location on the radar screen.

12. The radar simulator system defined in claim 9 in which said means for determining a composite electronic countermeasure intensity signal includes:
means for adding the electronic countermeasures of all targets within radar sectors of predetermined width;
means for modifying the sector sums by the antenna pattern;
and means adding the modified sector sums for each antenna sector position to secure a composite signal used to effect an electronic countermeasure display for each sector on the radar screen.

13. The radar simulator system defined in claim 9 and including:
means for splashing a target from the exercise by modifying the azimuth data for that target to prevent any match between the target azimuth and the antenna azimuth in the comparator, thereby preventing processing of information data for that target.

References Cited

UNITED STATES PATENTS 3,357,016  12/1967  Peronneau et al. _____ 35—10.4

RODNEY D. BENNETT, Jr., *Primary Examiner.*

T. H. TUBBESING, *Assistant Examiner.*